Sept. 5, 1961 H. W. RIMBACH 2,999,070
BLUE HALOPHOSPHATE PHOSPHOR
Filed March 1, 1954

INVENTOR.
H. W. RIMBACH
BY
ATTORNEY.

United States Patent Office 2,999,070
Patented Sept. 5, 1961

2,999,070
BLUE HALOPHOSPHATE PHOSPHOR
Henry W. Rimbach, Bloomfield, N.J., assignor to Westinghouse Electric Corporation, East Pittsburgh, Pa., a corporation of Pennsylvania
Filed Mar. 1, 1954, Ser. No. 413,111
4 Claims. (Cl. 252—301.4)

This application is a continuation-in-part of my application Serial Number 260,775, filed December 8, 1951, entitled "Phosphor," now abandoned. This invention relates to luminescent materials and, more particularly, to a halophosphate phosphor which will efficiently luminesce in the blue range of the spectrum, and to phosphor blends incorporating said blue halophosphate phosphor.

At the present time, magnesium tungstate is used in phosphor blends for fluorescent lamps to provide radiation in the blue range of the spectrum in response to excitation by the 2537 A.U. ultra-violet radiation of a mercury vapor discharge. The use of magnesium tungstate has several disadvantages when blended with halophosphates for tungstate particles have a tendency to "smear" over halophosphate particles during preparation of the phosphor suspension used to coat the phosphor on the inner surface of a vitreous envelope. Thus, the greater the proportion of tungstates present in the phosphor blend, the more carefully the milling must be controlled or an off-color phosphor is apt to result. In addition, tungstates are relatively expensive as compared to halophosphates and within recent years tungstates have at times become a critical item.

I have found that a halophosphate with an antimony activator will efficiently radiate in the blue range and may be used to replace the presently used magnesium tungstate. This blue halophosphate phosphor is an improvement on the halophosphate phosphor as described in the Patent No. 2,488,733 to McKeag and Ranby, dated Nov. 22, 1949.

It is the general object of this invention to avoid and overcome the foregoing and other difficulties of and objections to prior art practices by the provision of a blue halophosphate which has a high efficiency and which may be used to replace the presently used magnesium tungstate in phosphor blends.

It is a further object of this invention to provide a blue halophosphate phosphor which may be readily blended with other phosphors with good color control.

The aforesaid objects of the invention, and other objects which will become apparent as the description proceeds, are achieved by providing a blue halophosphate phosphor which efficiently radiates in the blue range of the spectrum and in which there is approximately from 0.73 to 0.91 mole of halide per 3 moles of 2P (or 6 moles of P), from 9.73 to 9.20 moles of alkaline earth metal per 3 moles of 2P, from 0.210 to 0.143 mole of chlorine per 1 mole of fluorine, from 0 to 0.200 mole of strontium per 1 mole of calcium and activated by 0.3% to 2% by weight of antimony.

For a better understanding of the invention, reference should be had to the accompanying drawing wherein.

Figure 1:
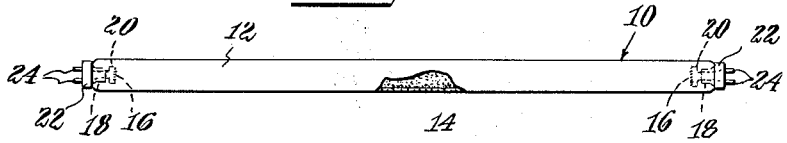
FIG. 1 is a standard fluorescent lamp, shown partly in section, which has my blue halophosphate internally coated on the vitreous envelope.

Although the principles of the invention are broadly applicable to luminescent materials and blends of luminescent materials, the invention is usually employed in conjunction with a fluorescent lamp and hence it has been so illustrated and will be so described.

Throughout this description, I will be referring to the terms "2500° K., 3500° K. or 4500° K. halophosphate phosphors" and before proceeding to a further description of this invention, it is best to fully describe these terms.

The term "halophosphate phosphors" is actually broader than the meaning which the term has acquired in the phosphor art where halophosphate phosphors, in general are regarded as more or less analogous to the natural mineral apatite and are supposed to be represented by an activated matrix such as $3M_3(PO_4)_2 \cdot 1M'L_2$ where L represents one or a mixture of halogens and M and M' represent either different or identical bivalent metals or mixtures of such metals. Halophosphate phosphors are commonly designated in the art by the color temperature of the radiation of the lamps into which they are incorporated. In this respect reference is made to the Handbook of Colorimetry by Arthur C. Hardy, page 15, published by the Technology Press, Massachusetts Institute of Technology, Cambridge, Mass. (1936). As therein indicated, "the chromaticity of the radiation from a black body at various temperatures (may be indicated on an I.C.I. diagram). It is possible to obtain radiation which is not describable by Planck's Law that will nevertheless have the same chromaticity as a black body at the same temperature. This temperature is called the color temperature of the radiation." Thus a 3500° K. halophosphate phosphor may be ordered from a commercial supplier, who will supply a halophosphate phosphor having the general formulation as heretofore given, and a lamp which incorporates this halophosphate as a phosphor will radiate at a color which has the same chromaticity as a black body at the designated temperature within, of course, the commercially acceptable color limits. The exact chemical composition of the individual 3500° K. halophosphate phosphors received may vary slightly, the spectral distribution of individual 3500° K. halophosphate phosphors may vary slightly, but the resulting chromaticity will be within the commercial color limits as specified, which with efficiency are the most important considerations where a phosphor is concerned. It is for this reason that a man skilled in the art orders a 3500° K. halophosphate phosphor, for example, rather than specifying the exact chemical composition of the halophosphate phosphor which he desires. It is for this reason that there is specified herein the color temperature and generic designation "halophosphate" rather than the chemical compositions for some of the halophosphate phosphors which are referred to.

Throughout the remainder of this description, the color temperature and color temperature limits for halophosphate phosphors will be referred to, as is customary in the art. To be technically correct the halophosphate color temperature should be defined as the color temperature of a standard 40 w. T12 lamp having the designated phosphor incorporated therein. However, reference to the color temperature of a phosphor only, when what is really meant is the color temperature of a standard 40 w. T12 lamp having the designated phosphor incorporated therein, is so well-known that this customary practice will be followed throughout this description.

There is tabulated in the following table analyses of specific examples of 4500° K., 3500° K., 3000° K. and 2500° K. halophosphate phosphors. It is to be clearly understood that many other halophosphate phosphors will display the color temperatures as indicated, but will have different compositions, as heretofore explained.

| Components | Specific Examples | | | |
|---|---|---|---|---|
| | 4,500° K. | 3,500° K. | 3,000° K. | 2,500° K. |
| P | 3.00 | 3.00 | 3.00 | 3.00 |
| Ca | 4.40 | 4.37 | 4.32 | 4.28 |
| Sr | 0.22 | 0.22 | 0.21 | 0.22 |
| $Cl_2$ | 0.08 | 0.07 | 0.07 | 0.09 |
| $F_2$ | 0.37 | 0.39 | 0.39 | 0.36 |
| Mn | 0.08 | 0.12 | 0.16 | 0.42 |
| Sb | 0.02 | 0.04 | 0.05 | 0.03 |

With specific reference to the form of the invention illustrated in the drawing, the numeral 10 indicates a fluorescent lamp comprising a generally hollow cylindrical vitreous envelope 12 internally coated with a daylight phosphor 14 incorporating my new blue halophosphate phosphor, for example, see Example 3, column 4. Sealed at each end of envelope 12 are mounts, each comprising an electrode 16, reentrant stem press 18, lead-in conductors 20 base cap 22 and base pins 24, as are well known in the art.

The blue halophosphate of this invention corresponds to the regular halophosphate formula except that the ratios of halide to phosphorus and alkaline earth metal to phosphorus are lower than indicated in the regular halophosphate formula, heretofore referred to. In the blue halophosphate of this invention the ratio of $(Cl_2+F_2)$ to 2P may vary from 0.73/3.00 to 0.91/3.00 with the optimum proportions being within the range of from 0.79/3.00 to 0.86/3.00; the ratio of Ca to 2P or (Ca+Sr) to 2P is from 9.73/3.00 to 9.20/3.00, with the optimum being within the range of from 9.5/3.00 to 9.3/3.00; the ratio of chlorine to fluorine is from 0.210/1.00 to 0.143/1.00 with the optimum being about 0.179/1.00; the ratio of strontium to calcium may be from 0. to 0.200/1.00 and the desirable ratio of strontium to calcium does not exceed .050/1.00. Of course the phosphor may contain only traces, e.g., 0.01%, of strontium, if desired. Antimony is present as an activator from amounts varying from 0.3% to 2.0% by weight of the phosphor.

Figure 3:
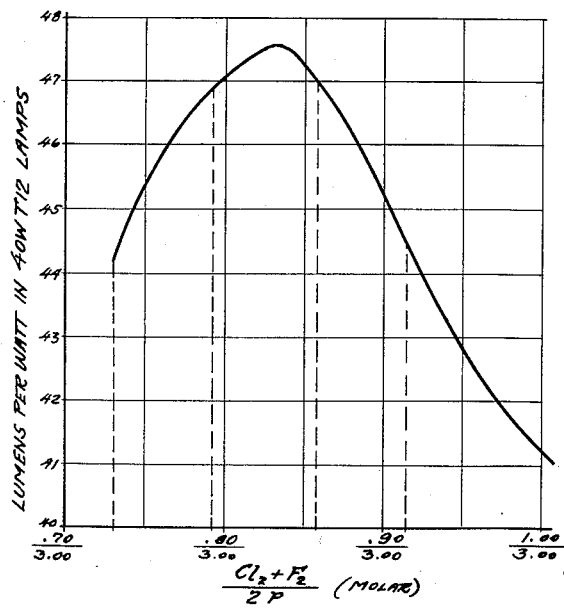
FIG. 3 is a graph plotting efficiency in lumens per watt vs. the molar ratio of $Cl_2+F_2$ to 2P in my new blue halophosphate.

In FIG. 3 is illustrated the effect on lamp efficiency through varying the ratio of halide to phosphorous, and as indicated, when the ratio is at the minimum of 0.73/3 the lumens per watt are about 44.3; when the ratio is within the optimum range, namely from 0.79/3.00 to 0.86/3.00, the lumens per watt average about 47.3; when the ratio is at the maximum of 0.91/3 the lumens per watt are about 44.5; when the ratio is 1.00/3.00 the lumens per watt are about 41.4. Blue halophosphate phosphors having ratios of $(Cl_2+F_2)$ to 2P outside the limit extremes as given will still be generally satisfactory regarding their color, but their efficiency which will be comparatively low, as shown in FIG. 3.

Figure 4:
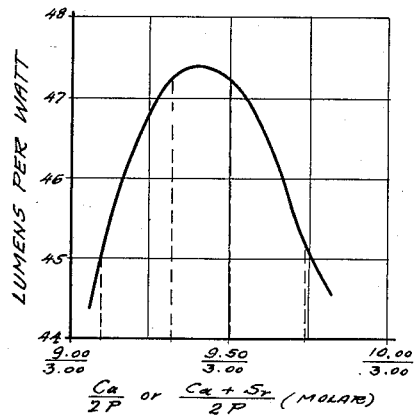
FIG. 4 is a graph plotting efficiency in lumens per watt vs. the molar ratio of Ca+Sr to 2P in my new blue halophosphate.

In FIG. 4 is illustrated the effect of varying the ratio of Ca to 2P or (Ca+Sr) to 2P. At the lower permissible extreme of the ratio, namely 9.2/3 the lumens per watt are approximately 45. At the optimum range, namely from 9.3/3.00 to 9.5/3.00, the lumens per watt average about 47.3 and at the upper permissible limitation, namely 9.73/3.00, the lumens per watt are about 45.2. In each of the curves of FIGS. 3 and 4, the readings were taken with other variables maintained at their optimums. It is obvious that the extremes in limitations have been arbitrarily set by defining the useful limitations for the phosphor. The ranges could be broadened if lamp efficiency or color were to suffer accordingly, or vice-versa, the foregoing ranges could be narrowed if higher standards of efficiency and color were to be maintained. Thus the ranges which I have set are purely arbitrary, based on the dictates of competitive efficiencies and color.

Figure 2:
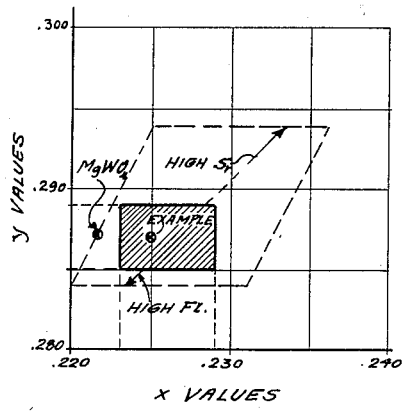
FIG. 2 is a section of the I.C.I diagram illustrating the desired and tolerable color limitations for my new blue halophosphate.

There is illustrated in FIG. 2 a rectangle contained within a quadrilateral, both figures being positioned on a section of the I.C.I. diagram. The larger quadrilateral represents the tolerable color limitations for my blue halophosphate phosphor and the smaller rectangle represents the desirable color limitations for my blue halophosphate phosphor. If the ratio of chlorine to fluorine is on the high side, the phosphor color will tend toward the yellow-green, i.e., toward the upper right hand extreme of the quadrilateral, and thus produce a halophosphate phosphor which varies greatly in color from magnesium tungstate and which is therefore off-color for purposes of blending. If the ratio of chlorine to fluorine is on the low side, the phosphor color temperature will become bluer, i.e., will tend toward the lower left hand extremes of the quadrilateral with resulting decrease in efficiency.

If the Sr to Ca ratio exceeds 0.200/1.00 the phosphor color will again tend toward the yellow-green which is without the tolerable color limits as illustrated in FIG. 2 and again will produce a phosphor which is difficult to blend, as hereinbefore explained.

As specific examples, blue halophosphates, according to this invention which radiate efficiently in the blue range may have the following composition:

*Examples*

(1) $8.28CaO.(0.206SrO).(3.00P_2O_5)$
$.(0.678CaF_2+0.106CaCl_2):Sb$ (2) $8.28CaO.(0.206SrO).(3.00P_2O_5)$
$.(0.678CaF_2+0.106SrCl_2):Sb$ (3) $8.38CaO.(0.275SrO).(3.00P_2O_5)$
$.(0.737CaF_2+0.096SrCl_2):Sb$ (4) $8.38CaO.(0.275SrO).(3.00P_2O_5)$
$.(0.737CaF_2+0.096CaCl_2):Sb$

The color temperature for Examples 3 and 4 are indicated on FIG. 2 by I.C.I. coordinates $x=0.225$, $y=0.287$.

In preparing the specific Examples 3 and 4 of the blue halophosphates of this invention I may mix the following in the proportions as given.

*Example I (raw mix of specific Example 3)*

| Ingredient: | Parts by weight |
|---|---|
| $CaHPO_4$ | 268 |
| $CaCO_3$ | 77 |
| $CaF_2$ | 20 |
| $SrCl_2$ | 11.1 |
| $Sb_2O_3$ | 4.5 |

*Example II (raw mix of specific Example 4)*

| Ingredient: | Parts by weight |
|---|---|
| $CaHPO_4$ | 268 |
| $CaCO_3$ | 77 |
| $CaF_2$ | 20 |
| $CaCl_2$ | 7.8 |
| $Sb_2O_3$ | 4.5 |

The calcium acid phosphate and calcium carbonate may be replaced by preformed tertiary calcium phosphate. The raw mix ingredients are well mixed in preparing the phosphor and may be fired only once at 1125° C. to 1165° C. for about three hours in covered silica dishes charged to a depth of 1½″ to 2″. With the above method of firing, the optimum activating proportion of antimony is approximately 1% by weight of the raw mix. The optimum proportion of antimony for the raw mix will vary between approximately 0.5% and 2% depending upon the method of firing. For an efficient blue phosphor the antimony in the fired phosphor should constitute between approximately 0.3% and 2% by weight of the phosphor.

I have used my blue halophosphate phosphor to furnish radiation in the blue range in the following blends of phosphors for fluorescent lamps. The color temperatures of these blends may be defined the color temperature of a lamp incorporating the blend, which lamp will have a radiation color temperature falling within an elipse centered at the following points on an I.C.I. diagram and bounded by color limitations and minimum perceptible color differences as given in the following table.

| Blend | Eliptical center (I.C.I. Coordinates) | |
|---|---|---|
| | x | y |
| Daylight | .313 | .324 |
| Standard Cool White | .360 | .363 |
| Deluxe Cool White | .369 | .360 |
| Soft White | .396 | .352 |
| White | .405 | .390 |
| Standard Warm White | .436 | .404 |
| Deluxe Warm White | .438 | .393 |

| Blend | Eliptical Limits | |
|---|---|---|
| | Color Temp., ° K. | M.P.C.D. |
| Daylight | 6,900–6,100 | ±10 MPCD. |
| Standard Cool White | 4,650–4,350 | ±10 MPCD. |
| Deluxe Cool White | 4,340–4,040 | −3, −23 MPCD. |
| Soft White | 3,575–3,225 | −30, −50 MPCD. |
| White | 3,600–3,400 | ±10 MPCD. |
| Std. Warm White | 3,075–2,925 | ±10 MPCD. |
| Deluxe Warm White | 2,965–2,815 | −2, −22 MPCD. |

The blue halophosphate of this invention has a peak radiation, in response to 2537 A.U. excitation, at about 4800 A.U. and extends from approximately 3500 A.U. to 6500 A.U. The phosphor can thus be used in any blend which is deficient in this blue range of radiation in addition to those blends as specified.

Daylight blends may be prepared by blending the blue halophosphate of this invention with a 3500° K halophosphate and calcium tungstate. Calcium silicate may be used in place of the calcium tungstate. The calcium tungstate furnishes radiation in the deep blue range of the spectrum while calcium silicate activated by lead and manganese furnishes radiation chiefly in the orange range of the spectrum. The following are daylight blends incorporating the blue halophosphate of this invention. As a specific example of the blue halophosphate which may be used any of the following blends of Examples I through VI, see Example 3, column 4.

*Example I*

| Components | Parts by Weight | | |
|---|---|---|---|
| | Minimum | Specific Example | Maximum |
| blue halophosphate | 95 | 110 | 125 |
| 3,500° K. halophosphate | 115 | 135 | 155 |
| calcium tungstate | 15 | 20 | 30 |

*Example II*

| Components | Parts by Weight | | |
|---|---|---|---|
| | Minimum | Specific Example | Maximum |
| Blue halophosphate | 115 | 135 | 155 |
| 3,500° K. halophosphate | 65 | 75 | 85 |
| CaSiO₃:(Pb+Mn) (1.2 mole SiO₂ per 1.0 mole CaO:2.6% Mn, 0.8% Pb) | 15 | 20 | 50 |

A soft white blend will result from the following:

*Example III*

| Components | Parts by Weight | | |
|---|---|---|---|
| | Minimum | Specific Example | Maximum |
| blue halophosphate | 90 | 105 | 120 |
| 3,500° K. halophosphate | 45 | 55 | 65 |
| CaSiO₃:(Pb+Mn) (See Example II, daylight blend) | 110 | 130 | 150 |

A standard cool white blend (4500° K) will result from the following:

*Example IV*

| Components | Parts by Weight | | |
|---|---|---|---|
| | Minimum | Specific Example | Maximum |
| blue halophosphate | 25 | 42 | 60 |
| 3,500° K. halophosphate | | 150 | |

A luminescent material which will give a delux cool white radiation will result from the following.

*Example V*

| Components | Parts by Weight | | |
|---|---|---|---|
| | Minimum | Specific Example | Maximum |
| blue halophosphat | 60 | 70 | 80 |
| CaSiO₃:(Pb+Mn) (See Example II, daylight blend) | 65 | 75 | 85 |
| CaCeMnPO₄ | 45 | 52 | 60 |
| 2ZnO.SiO₂:1.5%Mn | 6 | 12.5 | 20 |

A deluxe warm white blend will result from the following:

*Example VI*

| Components | Parts by Weight | | |
|---|---|---|---|
| | Minimum | Specific Example | Maximum |
| blue halophosphate | 90 | 97 | 110 |
| CaSiO₃:(Pb+Mn) (See Example II, daylight blend) | | 300 | |
| 2ZnO.SiO₂:1.5%Mn | 30 | 45 | 60 |

Many blends, other than those as heretofore specified, may incorporate my new blue halophosphate in order to correct a deficiency in blue radiation. Broadly, my blue halophosphate may be blended with any phosphor or blend of phosphors which are normally deficient in the blue range of the spectrum for specific applications, in order to supply a need for efficient blue radiation to achieve a desired color of high efficiency. While the blue phosphors of the prior art could be blended equally well to supply the required blue radiation, the color control in the case of magnesium tungstate would not be as good as a blend incorporating my new blue halophosphate, and the cost would be greater. Blends incorporating the blue halophosphates of the prior art, instead of the blue halophosphate of this invention, would not be as efficient.

It will be recognized that the objects of the invention have been achieved by providing a blue halophosphate which has a high efficiency which may be blended with other phosphors, which blends have good color control. In addition, I have provided a blue halophosphate which is much more economical to use than the blue radiating magnesium tungstate of the prior art.

While in accordance with the patent statutes, a best known embodiment of the invention has been illustrated and described in detail, it is to be particularly understood that the invention is not limited thereto or thereby.

I claim:

1. A blue halophosphate phosphor consisting essentially of a matrix of halophosphate of alkaline-earth metal activated by from 0.3% to 2.0% by weight of Sb, wherein the halogen consists of mixtures of fluorine and chlorine, and the alkaline-earth metal is one of the group consisting of calcium and mixtures of calcium and strontium, the ratio of $(Cl_2+F_2)/2P$ being from 0.79/3.00 to 0.86/3.00, the ratio of $(Ca+Sr)/2P$ being from 9.3/3.00 to 9.5/3.00, the ratio of Cl/F being from 0.210/1.00 to 0.143/1.00, and the ratio of Sr/Ca being from 0 to 0.200/1.00.

2. A blue-halophosphate phosphor consisting essentially of a matrix of halophosphate of alkaline-earth metal activated by from 0.3% to 2.0% by weight of Sb, wherein the halogen consists of mixtures of fluorine and chlorine, and the alkaline-earth metal consists of calcium, the ratio of $(Cl_2+F_2)/2P$ being from 0.79/3.00 to 0.86/3.00, the ratio of $(Ca)/2P$ being from 9.3/3.00 to 9.5/3.00 and the ratio of Cl/F being from 0.210/1.00 to 0.143/1.00.

3. A blue-halophosphate phosphor consisting esssentially of a matrix of halophosphate of alkaline-earth metal activated by from 0.3% to 2.0% by weight of Sb, wherein the halogen consists of mixtures of fluorine and chlorine, and the alkaline-earth metal consists of calcium, the ratio of $(Cl_2+F_2)/2P$ being from 0.79/3.00 to 0.86/3.00, the ratio of $(Ca)/2P$ being from 9.3/3.00 to 9.5/3.00, and the ratio of Cl/F being about 0.179/1.00.

4. A blue halophosphate phosphor consisting essentially of a matrix of halophosphate of alkaline earth metal activated by 0.3% to 2.0% by weight of Sb, wherein the halogen consists of mixtures of fluorine and chlorine, and the alkaline earth metal is one of the group consisting of calcium and mixtures of calcium and strontium, the ratio of $(Cl_2+F_2)/2P$ being from 0.79/3.00 to 0.86/3.00, the ratio of $(Ca+Sr)/2P$ being from 9.3/3.00 to 9.5/3.00, the ratio of Cl/F being about 0.179/1.00 and the ratio of Sr/Ca being from 0 to .050/1.00.

References Cited in the file of this patent

UNITED STATES PATENTS

| | | |
|---|---|---|
| 2,488,733 | McKeag | Nov. 22, 1949 |
| 2,579,900 | Butler | Dec. 25, 1951 |
| 2,755,254 | Butler | July 17, 1956 |

FOREIGN PATENTS

| | | |
|---|---|---|
| 673,637 | Great Britain | June 11, 1952 |
| 678,590 | Great Britain | Sept. 3, 1952 |

OTHER REFERENCES

Jerome: Article in J. Electrochem. Soc., September 1950, vol. 97, No. 9, pp. 265–270.